US008494590B2

(12) United States Patent
Sheldon et al.

(10) Patent No.: US 8,494,590 B2
(45) Date of Patent: Jul. 23, 2013

(54) INTEGRATED MEDIA USER INTERFACE (75) Inventors: Kerri I. H. Sheldon, Seattle, WA (US);
Timothy J. Scudder, Bellevue, WA (US); Veronica Y. Law, Seattle, WA (US); Marc S. Doll, Seattle, WA (US); Jonathan D. Wiswall, Kirkland, WA (US); Megan L. Tedesco, Sammamish, WA (US); Sergey Chub, Redmond, WA (US); Eric J. Hull, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 641 days.

(21) Appl. No.: 12/717,032

(22) Filed: Mar. 3, 2010

(65) Prior Publication Data
US 2011/0190032 A1 Aug. 4, 2011

Related U.S. Application Data (60) Provisional application No. 61/301,387, filed on Feb. 4, 2010.

(51) Int. Cl.
*H04B 1/38* (2006.01)

(52) U.S. Cl.
USPC ....... 455/566; 455/3.04; 455/158.4; 715/717; 715/716

(58) Field of Classification Search
USPC ............ 455/566, 3.02, 3.06, 425, 456.6, 455/41.2, 552.1, 556.1, 556.2, 557, 567, 455/179.1, 160.1, 186.1, 456.1, 3.04, 158.4; 715/717, 835, 769, 81, 719, 745, 716, 772, 715/771; 707/10, E17.009, 104.1; 725/52, 725/53, 80, 42, 46, 135, 133, 141, 153; 386/46, 386/125; 709/231, 223, 219, 203, 206; 345/619
See application file for complete search history.

(56) References Cited

U.S. PATENT DOCUMENTS

| 7,454,511 | B2 * | 11/2008 | Weast ........................... 709/231 |
| 7,636,509 | B2 * | 12/2009 | Davis ........................... 386/239 |
| 2004/0198279 | A1 * | 10/2004 | Anttila et al. ............... 455/179.1 |
| 2007/0028267 | A1 * | 2/2007 | Ostojic et al. ................... 725/52 |
| 2007/0048714 | A1 | 3/2007 | Plastina et al. |
| 2008/0207182 | A1 | 8/2008 | Maharajh et al. |
| 2008/0295012 | A1 | 11/2008 | Sloo et al. |

(Continued)

FOREIGN PATENT DOCUMENTS

| KR | 20070107443 | 11/2007 |
| KR | 20070107512 | 11/2007 |
| KR | 20090025534 | 11/2009 |

OTHER PUBLICATIONS

"PCT Search Report and Written Opinion", Application No. PCT/US2011/020721, (Aug. 24, 2011), 9 pages.

Hu, et al. , "Mobile Media Content Sharing in UPnP-Based Home Network Environment", Retrieved at <<http://www.iis.sinica.edu.tw/page/jise/2008/200811_09.pdf>>, Journal of Information Science and Engineering 24, (2008), pp. 1753-1769.

(Continued)

*Primary Examiner* — Tan Trinh
(74) *Attorney, Agent, or Firm* — Wolfe-SBMC (57) ABSTRACT

An integrated media user interface is described. In an implementation, a user interface is output that includes a plurality of representations of media, each of the media rendered by the mobile device through execution of a respective one of a plurality of applications. Responsive to selection of at least one of the representations, a corresponding application is located to render the media represented by the at least one said representation. The media represented by the selected representation is rendered through execution of the located application.

20 Claims, 5 Drawing Sheets

U.S. PATENT DOCUMENTS

| | | | | |
|---|---|---|---|---|
| 2009/0013048 | A1* | 1/2009 | Partaker et al. | 709/206 |
| 2009/0070695 | A1* | 3/2009 | Oh et al. | 715/769 |
| 2009/0178006 | A1* | 7/2009 | Lemay et al. | 715/835 |
| 2009/0300498 | A1* | 12/2009 | Falchuk | 715/719 |
| 2010/0005104 | A1* | 1/2010 | Dimaria et al. | 707/10 |
| 2010/0169778 | A1* | 7/2010 | Mundy et al. | 715/716 |
| 2010/0282045 | A1* | 11/2010 | Chen et al. | 84/612 |
| 2011/0131520 | A1* | 6/2011 | Al-Shaykh et al. | 715/772 |

OTHER PUBLICATIONS

Grafe, et al., "NGN Based IPTV & Telecommunication Services for the Vista Media Center", Retrieved at <<http://ieeexplore.ieee.org/stamp/stamp.jsp?tp=&arnumber=5206319, 2009, pp. 6.

* cited by examiner

INTEGRATED MEDIA USER INTERFACE

CROSS REFERENCE

This application claims priority to U.S. Provisional Patent Application No. 61/301,387, filed Feb. 4, 2010, the entire disclosure of which is hereby incorporated by reference.

BACKGROUND

Mobile devices (e.g., wireless phones, portable music players, game players, and so on) have become an integral part of everyday life. However, the form factor employed by conventional mobile device is typically limited to promote mobility of the device.

For example, the mobile device may have a relatively limited amount of display area when compared to a conventional desktop computer, e.g., a PC. Additionally, the mobile device may have limited input devices when compared to "full size" computing devices. Therefore, conventional techniques used to interact with a desktop computer may be inefficient when employed by a mobile device. For example, it may be difficult to navigate through a variety of traditional menus to access content that is available from the mobile device, which may lead to user frustration and dissatisfaction with the device.

SUMMARY

An integrated media user interface is described. In an implementation, a user interface is output having a plurality of representations of media, each of the media rendered by the mobile device through execution of a respective one of a plurality of applications. Responsive to selection of at least one of the representations, a corresponding application is located to render the media represented by the representation. The media represented by the selected representation is rendered through execution of the located application.

In an implementation, one or more computer-readable storage media comprise instructions that are executable to cause a mobile device to perform operations that include output of a user interface that includes a plurality of representations of media, each of which representing media that was recently made available for output by the mobile device. Responsive to a selection of at least one of the representations, a corresponding application is located to render the media represented by the representation. The media represented by the selected representation is rendered through execution of the located application.

In an implementation, a mobile device includes a display device and one or more modules. The one or more modules are configured to determine which media is to be represented in a user interface, automatically and without user interface, from media that was rendered by the mobile device and media that was recently made available for output by the mobile device. The one or more modules are further configured to display, on the display device, the user interface having representations of the determined media, the representations being selectable to cause a corresponding one of a plurality of applications to be executed to render the represented media.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Mobile devices typically have a small form factor to aide mobility of the mobile device. For example, the mobile device (e.g., a mobile phone, portable music player, and so on) may be configured with a relatively minimal amount of display area and limited input devices (e.g., a keypad) so that the device may be easily transported. Consequently, traditional techniques used to interact with a conventional computer (e.g., a desktop PC) may be frustrating when used in conjunction with a mobile device. For instance, navigating through traditional menus that were used to organize media may involve a significant amount of steps, especially to access media using different applications. This may be especially frustrating when implemented by a mobile device due to the generally small factor.

An integrated media user interface is described. In an implementation, a user interface is configured to display representations of media that is available for output via multiple applications. For example, the user interface may include a history section that includes representations of media that was recently rendered by a mobile device, that is new to the mobile device (e.g., recently purchased), and so on. Selection of the representations may cause execution of a corresponding application to render the represented media. In this way, the user interface may act as a media hub for the mobile device to access and render media from a variety of different sources, further discussion of which may be found in relation to the following sections.

In the following discussion, a variety of example implementations of a mobile device (e.g., a portable music player) are described. Additionally, a variety of different functionality that may be employed by the mobile device is described for each example, which may be implemented in that example as well as in other described examples. Accordingly, example implementations are illustrated of a few of a variety of contemplated implementations. Further, although a mobile device having one or more modules that are configured to provide portable media player functionality are described, a variety of other mobile devices are also contemplated, such as mobile phones having telephone functionality, personal digital assistants, dedicated messaging devices, portable game devices, netbooks, tablets (e.g., a touchscreen pad), and so on.

Example Implementations

Figure 1:
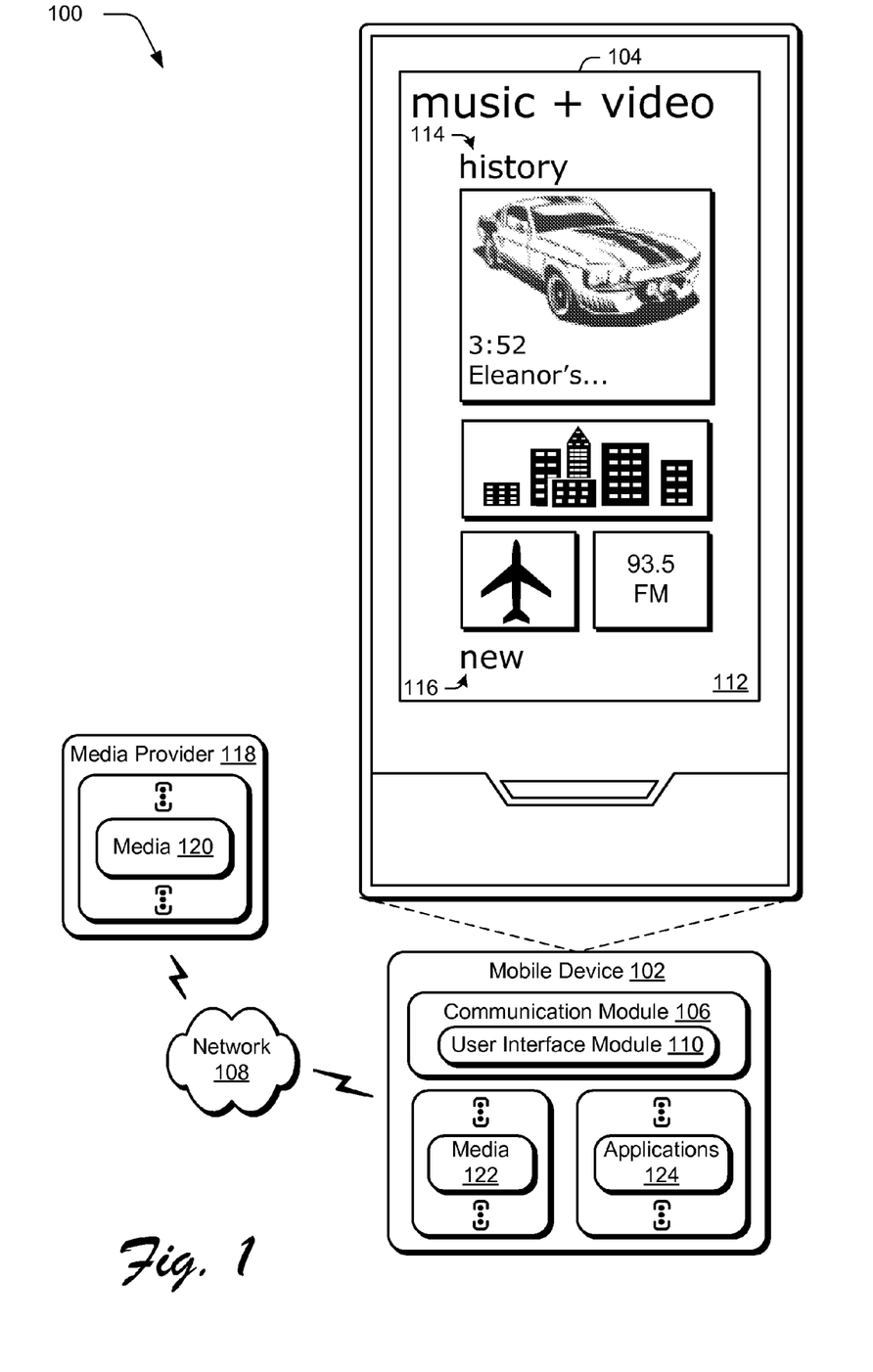
FIG. 1 is an illustration of an example implementation of a mobile device in accordance with one or more embodiments of devices, features, and systems for rendering media.

FIG. 1 is an illustration of an example implementation 100 of a mobile device 102 in accordance with one or more embodiments of devices, features, and systems for rendering media. The mobile device 102 includes a display device 104 that may be used to output a variety of content, such as a caller identification (ID), contacts, images (e.g., photos) as illustrated, email, multimedia messages, Internet browsing, game play, music, video and so on. In an implementation, the display device 104 is configured to function as an input device by incorporating touchscreen functionality, e.g., through capacitive, surface acoustic wave, resistive, optical, strain gauge, dispersive signals, acoustic pulse, and other touchscreen functionality. The touchscreen functionality (as well as other functionality such as track pads) may also used to detect gestures, further discussion of which may be found in relation to FIG. 2.

The mobile device 102 is also illustrated as including a communication module 106. The communication module 106 is representative of functionality of the mobile device 102 to communicate via a network 108, e.g., via browser functionality. In another example, the communication module 106 may include telephone functionality to make and receive telephone calls. The communication module 106 may also include a variety of other functionality, such as to capture content, form short message service (SMS) text messages, multimedia messaging service (MMS) messages, emails, status updates to be communicated to a social network service, and so on. A variety of other examples are also contemplated, such as blogging (e.g., micro-blogging), and so on.

The mobile device 102 is also illustrated as including a user interface module 110. The user interface module 110 is representative of functionality of the mobile device 102 to generate, manage, and/or output a user interface 112 for display on the display device 104. A variety of different techniques may be employed to generate the user interface 112 such that the user interface 112 may provide a variety of functionality.

Figure 2:
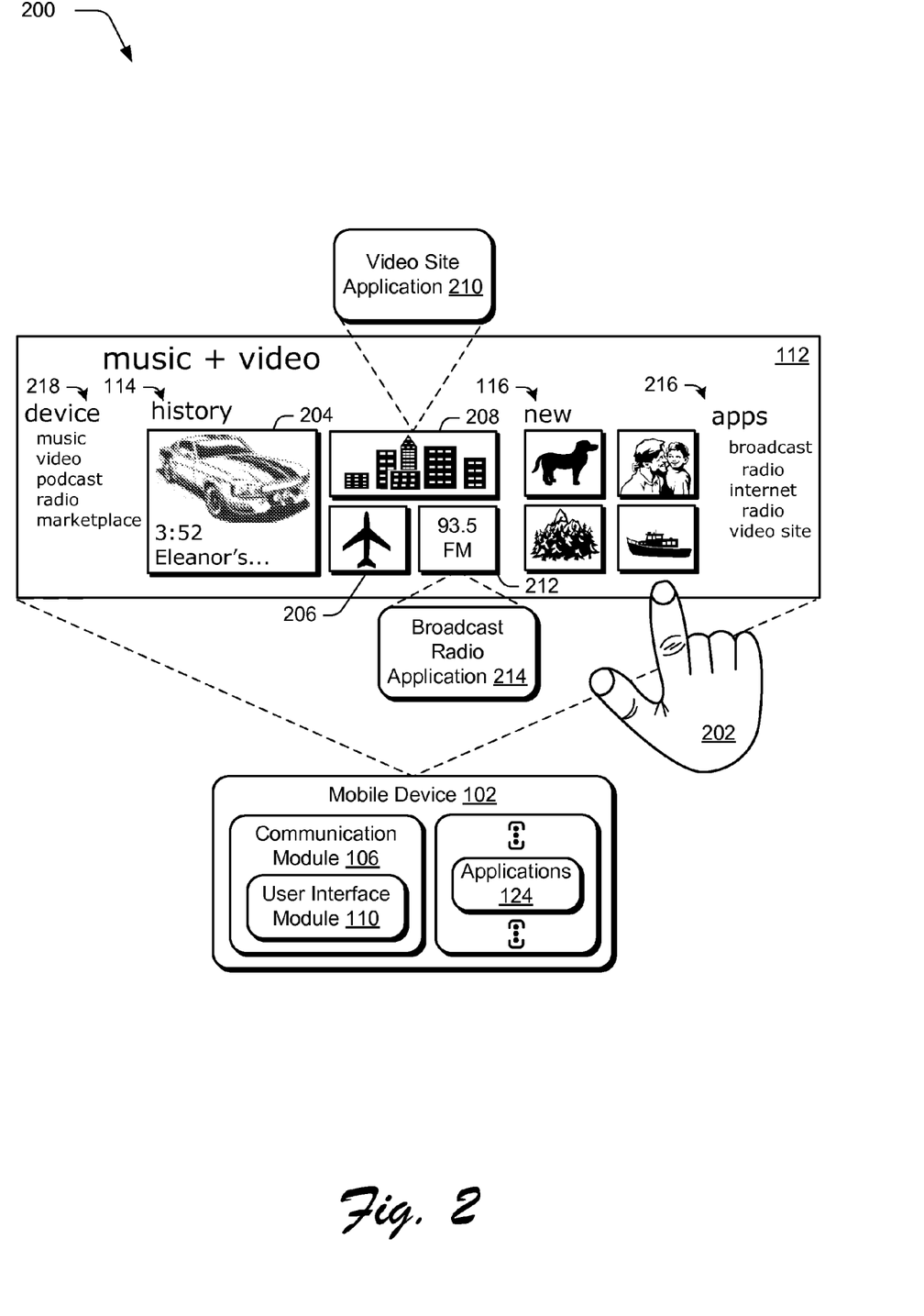
FIG. 2 is an illustration of a system in an example implementation in which a user interface of FIG. 1 is configured as an integrated media hub to initiate respective applications configured to render media represented in the user interface.

For example, the user interface module 110 may configure the user interface 112 to act as an integrated media hub for the mobile device 104. As illustrated in FIG. 1, for instance, the user interface 112 includes a portion 114 labeled "history" that includes representations of media that was rendered by the mobile device 102. For instance, the user interface module 110 may be configured to determine which media was rendered by the mobile device 102 and in what order. The user interface module 110 may then represent this media in the user interface using a representation for a select number of the media, e.g., most recently rendered by the mobile device 102. The representations may be configured in a variety of ways, such as album art, title pages, icons, and so on that may be generated by the user interface module 110, fetched as part of the media itself, obtained as a preconfigured representations, and so on. Likewise, the user interface 112 may include additional portions to provide additional functionality, such as a "new" portion 116, further discussion of which may be found in relation to FIG. 2. Although the user interface 112 is configured for vertical scrolling in FIG. 1, other orientations are also contemplated such as horizontal scrolling as shown in FIG. 2.

As an integrated media hub, the user interface 112 may represent media from a variety of different sources. For example, one or more of the representations in the user interface may represent media that is accessible via the network 108, such as from a media provider 118 having one or more items of media 120. The media 120 may take a variety of forms, such as streaming media via Internet radio, streaming or downloadable video from a video sharing site, podcasts, and so on. The media 120 may also be representative of media that is available for purchase and download over the network 108 for local storage on the mobile device 102, which may be represented as media 122. Media 122 may also be representative of media that was stored locally on the mobile device 102 using other techniques, such as "ripping" CDs, local transfer from another device (e.g., a camera), and so on. A variety of other examples are also contemplated, such as to access media 120 over a wireless network 108, e.g., an FM broadcast radio network. In another example, other portions may be provided such as featured artists, most popular albums, and so on that are not specific to the mobile device 102 but instead are provided by a service, e.g., the media provider 118. Thus, a wide variety of different media may be represented in the user interface 112 by the user interface module 110.

To render this wide variety of different media, the user interface module 110 may leverage one or more applications 124, which may be configured to render particular types of media. For example, one of the applications 124 may be configured to render music, another one of the applications 124 may be configured to fetch and render streaming media 120 over the network 108, a further one of the applications 124 may be configured to tune and render broadcast radio media (e.g., FM radio), and so on. Thus, the user interface module 110 may configure the user interface to include representations of media from a variety of different sources and provide access to the media through a variety of different applications 124. In this way, the user interface 112 integrates this media to be selectable for rendering in a single view, further discussion of which may be found in relation to the following figure.

Generally, any of the functions described herein can be implemented using software, firmware, hardware (e.g., fixed logic circuitry), or a combination of these implementations. The terms "module," "functionality," and "logic" as used herein generally represent software, firmware, hardware, or a combination thereof. In the case of a software implementation, the module, functionality, or logic represents program code that performs specified tasks when executed on a processor (e.g., CPU or CPUs). The program code can be stored in one or more computer readable memory devices. The features of the user interface techniques described below are platform-independent, meaning that the techniques may be implemented on a variety of commercial computing platforms having a variety of processors.

FIG. 2 illustrates a system 200 in an example implementation in which the user interface 112 is configured as an integrated media hub for initiate respective applications configured to render media represented in the user interface. The user interface 112 in this example is configured in a panoramic view that is scrollable across the display device 104 of the mobile device 102 using a gesture, which is illustrated as being input using a finger of a user's hand 202.

As previously stated, the user interface 112 may be configured and managed by the user interface module 110 to include a variety of different portions. One such portion 114 includes representations of media that was most recently rendered by the mobile device 102, and is labeled "history." For example, the user interface module 110 may examine a document (e.g., an XML document) that is used to track when media was rendered by the mobile device 102. This media may then be represented in the history portion 114 of the user interface 112. The history portion 114 also includes a representation 204 of media that is currently being rendered by the mobile device 102. In the example illustrated in FIG. 2, the representation 204 of the media that is currently being rendered is larger than representations (e.g., representation 206) of media that is not currently being rendered. A sizing convention may also be used to indicate different types of media, such as a representation 208 of a video being displayed as larger than the representation 206 of music. A variety of other examples are also contemplated.

The user interface 112 is also configured by the user interface module 110 in this example to include a portion 116 that includes representations of media that has recently been made available to the mobile device 102. For example, the represented media may have been recently purchased (e.g., from the media provider 118 via the network 108), recently added to local storage of the mobile device 102, made available via a subscription service (e.g., via the network 108), and so on.

In an implementation, the representations are selectable via the user interface to be rendered by a corresponding one of the applications 124, regardless of which portion 114, 116 includes the representation. For example, the representation 208 of the video may be selected (e.g., via a tap of the finger of the user's hand 202). Accordingly, the user interface module 110 may detect the tap and initiate a corresponding one of the applications 124 that is configured to render the represented media, which is illustrated as a video site application 210 in the example of FIG. 2. Likewise, the representation 212 of a broadcast radio station is selectable to initiate execution of a corresponding broadcast radio application 214.

In an implementation, selection of the representation causes a user experience of the corresponding application to replace the user interface 112. In other words, selection of the representation causes output of a user experience (e.g., another user interface) of the application that is configured to render the represented media. Additionally, a user may navigate "back" to the user interface 112 by using a "back button" or employ any other navigation technique to navigate to the previous user interface.

The user interface 112 may employ a variety of other functionality through management by the user interface module 110. For example, the user interface 112 may be configured to include a portion 216 having representations of the applications that are available to render media that may be represented in the user interface 112. Examples of such applications include a representation of a broadcast radio application, an internet radio application, and a video site. Selection of the representations in this portion 216 may cause the represented application to initiate execution and/or navigation to a user experience of the represented application. In an implementation, this navigation permits the execution of the application to be initiated without specifying a particular item of media that is to be executed by the application, although other implementations are also contemplated.

The user interface 112 also includes a portion 218 to navigate to other functionality of the device 102, examples of which include "music," "video," "podcast," "radio," and "marketplace." A variety of other examples are also contemplated as before. Thus, the user interface module 110 may configure the user interface 112 to serve as an integrated media hub through which users may quickly access media that is to be rendered by a wide variety of applications 124. Further, the user interface 112 may be configured to display representations of this media concurrently. Thus, in this example the representations of the media is the user interface (and therefore a user may interact with the media directly), which thereby reduces the extra "chrome" (e.g., scroll bars, buttons, and so on) that is found in traditional user interfaces.

Further discussion of integrated media user interface techniques may be found in relation to the following procedures.

Example Procedures

The following discussion describes user interface techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to the environment 100 and system 200 of FIGS. 1 and 2, respectively.

Figure 3:
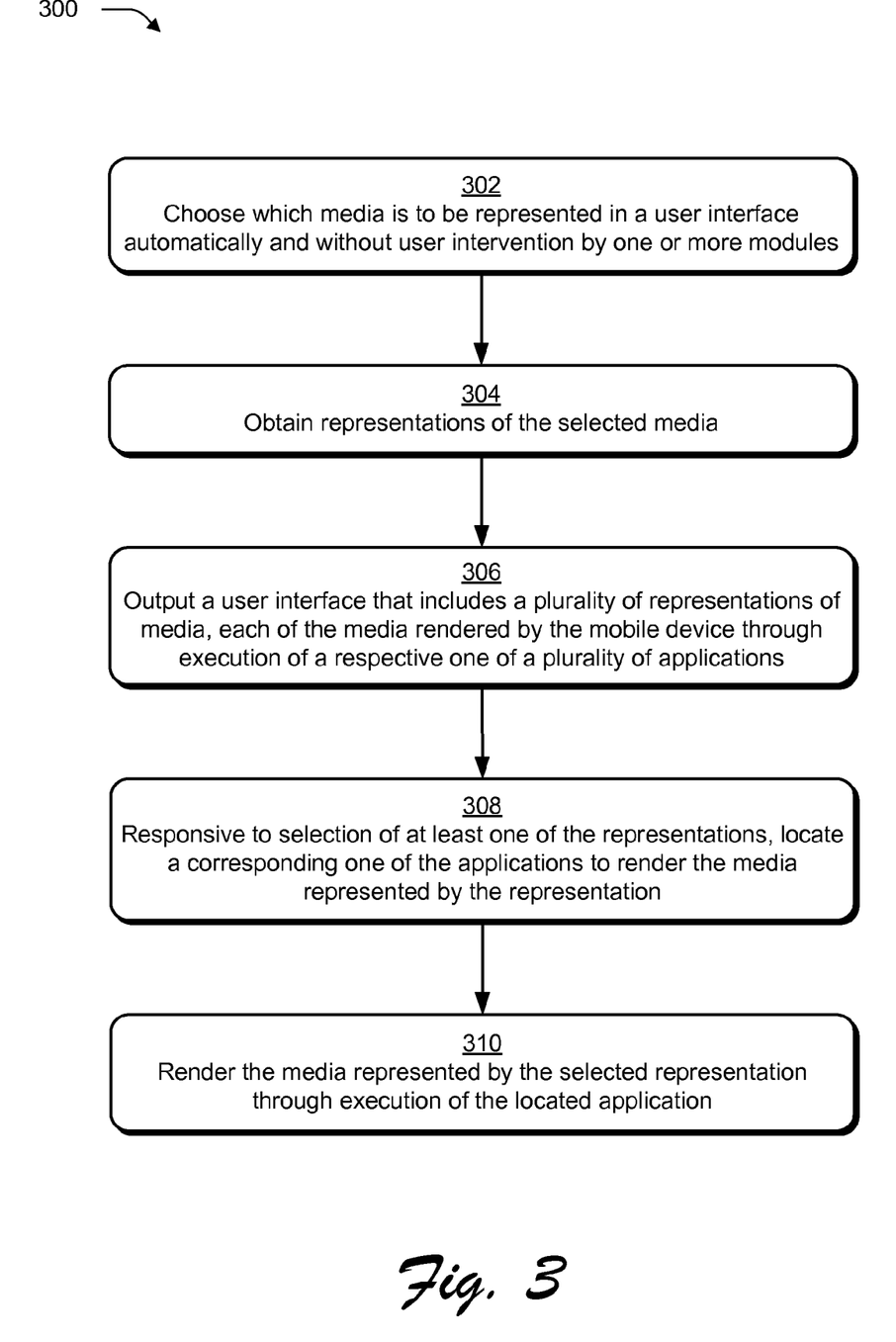
FIG. 3 is a flow chart that depicts a procedure in an example implementation in which a user interface is configured to include representations of media that was rendered by a mobile device.

FIG. 3 depicts a procedure 300 in an example implementation in which a user interface is configured to include representations of media that was rendered by a mobile device. Media is chosen which is to be represented in a user interface automatically and without user intervention by one or more modules (block 302). The user interface module 110 may employ a variety of different considerations for choosing media. In this example, the user interface module 110 determines which media has been rendered most recently by the mobile device 102. This determination may be performed in a variety of ways, such as based on metadata of the media that describes "when" the media was last rendered, through examination of a file (e.g., an XML file) maintained by the user interface module 110 by monitoring rendering of media by the mobile device 104, and so on.

Representations of the selected media are then obtained (block 304). The representations, for instance, may be taken from "album art" of the represented media, generated by the user interface itself to describe the media (e.g., the representation 212 of the broadcast radio station of FIG. 2), and so on.

A user interface is output that includes a plurality of representations of media, each of the media rendered by the mobile device through execution of a respective one of a plurality of applications (block 306). Continuing with the previous example, the user interface 112 may include a history portion 114 that details media that was rendered by the mobile device 102 using respective applications 124. As previously described, the media represented in the user interface 112 may be obtained from a variety of sources, both local to the device and remote over the network 108, e.g., from the media provider 118 through purchase, streaming, and so on.

Responsive to selection of at least one of the representations, a corresponding one of the applications is located to render the media represented by the representation (block 308). The user interface module 110, for instance, may locate one of the applications 124 that is configured to render media having a file extension of the represented media. In another example, selection of the representation itself may cause initiation of the application using one or more modules of an operating system of the mobile device 102. A variety of other examples are also contemplated.

The media represented by the selected representation is then rendered through execution of the located application (block 310). Continuing with the previous example, because the media may be obtained from a variety of different sources and have a variety of different configurations (e.g., music, video, etc.) the rendering of the media may be performed in a variety of different ways. For instance, the media may be rendered for display on the display device 104, rendered for audio output via one or more speakers, rendered for tactile input (e.g., vibrations, shaking, etc.), and so on. Although representations that are selected based on when the represented media was rendered by the mobile device 102 has been described, a variety of other considerations may also be utilized, an example of which is discussed in relation to the following figure.

Figure 4:
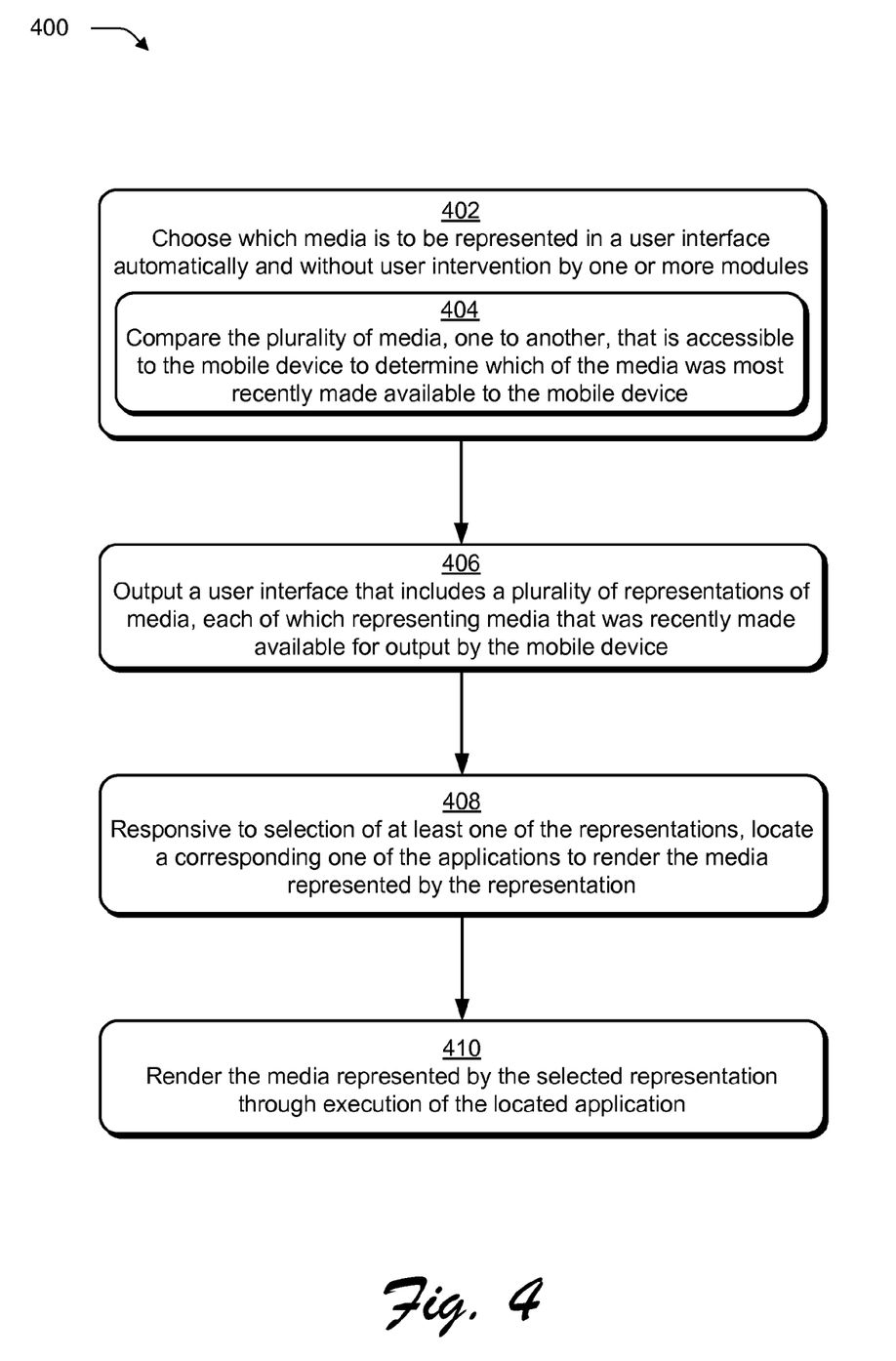
FIG. 4 is a flow chart that depicts a procedure in an example implementation in which a user interface is configured to include representations of media that was recently made available to a mobile device.

FIG. 4 depicts a procedure in an example implementation 400 in which a user interface is configured to include representations of media that was recently made available to a mobile device. One or more modules choose, automatically and without user intervention, which media is to be represented in a user interface (block 402). For example, the user interface module 110 may compare the plurality of media, one to another, that is accessible to the mobile device to determine which of the media was most recently made available to the mobile device (block 404). This availability may be made in a variety of ways, such as by a purchase and download, via a subscription to streaming media, and so on.

A user interface is output that includes a plurality of representations of media, each of which representing media that was recently made available for output by the mobile device (block 406). Responsive to selection of at least one of the representations, a corresponding one of the applications is located to render the media represented by the representation (block 408). The media represented by the selected representation is rendered through execution of the located application (block 410). One or more of these techniques may be performed as described above. As previously described, the user interface 112 may be configured by the user interface module 110 to include a variety of other functionality, e.g., direct access to applications using representations of the applications, and so on.

Example Device

Figure 5:
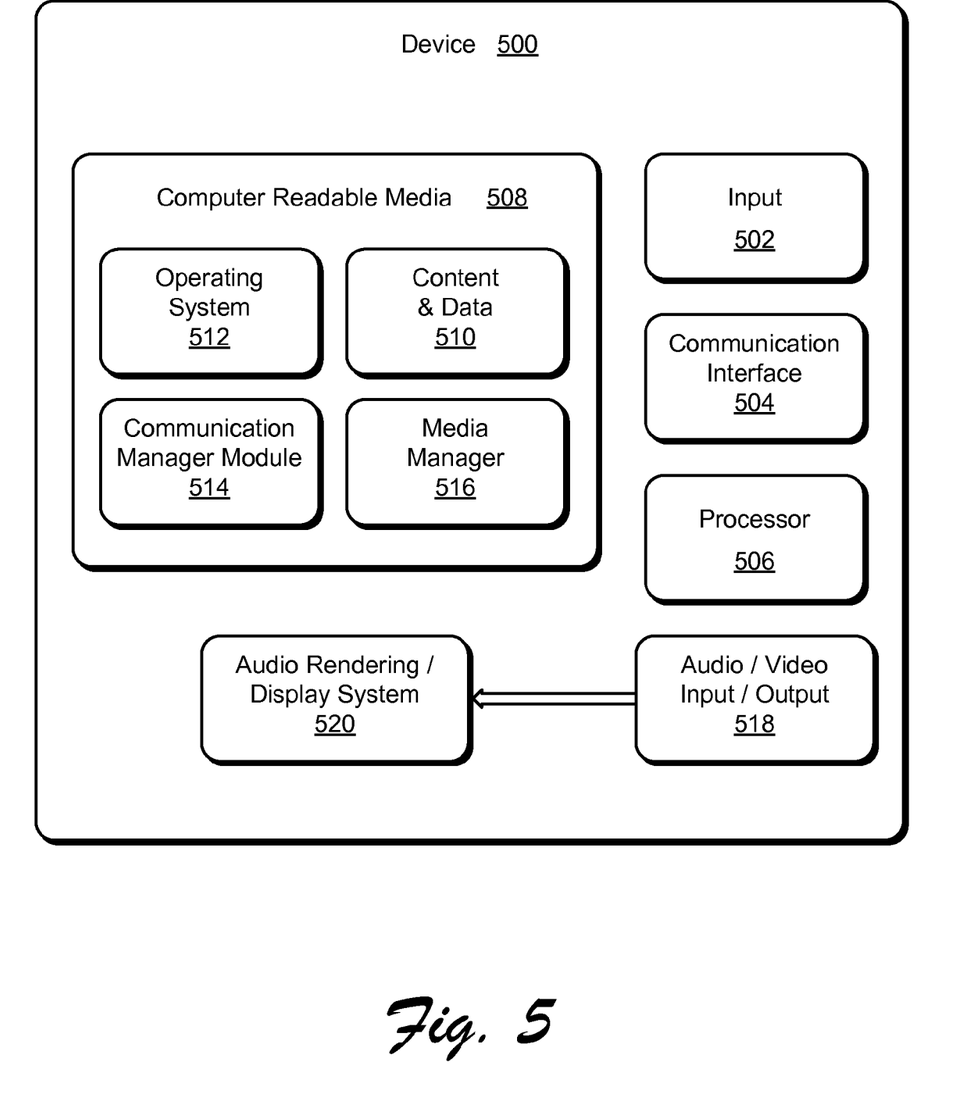
FIG. 5 illustrates various components of an example device that can be implemented in various embodiments as any type of a mobile device to implement embodiments of devices, features, and systems for the techniques described herein.

FIG. 5 illustrates various components of an example device 500 that can be implemented in various embodiments as any type of a mobile device to implement embodiments of devices, features, and systems for mobile communications. For example, device 500 can be implemented as any of the mobile devices 102 described with reference to respective FIGS. 1 and 2. Device 500 can also be implemented to access a network-based service, such as a social network service as previously described.

Device 500 includes input 502 that may include Internet Protocol (IP) inputs as well as other input devices, such as a keyboard. Device 500 further includes communication interface 504 that can be implemented as any one or more of a wireless interface, any type of network interface, and as any other type of communication interface. A network interface provides a connection between device 500 and a communication network by which other electronic and computing devices can communicate data with device 500. A wireless interface enables device 500 to operate as a mobile device for wireless communications.

Device 500 also includes one or more processors 506 (e.g., any of microprocessors, controllers, and the like) which process various computer-executable instructions to control the operation of device 500 and to communicate with other electronic devices. Device 500 can be implemented with computer-readable media 508, such as one or more memory components, examples of which include random access memory (RAM) and non-volatile memory (e.g., any one or more of a read-only memory (ROM), flash memory, EPROM, EEPROM, etc.).

Computer-readable media 508 provides data storage to store content and data 510, as well as device applications and any other types of information and/or data related to operational aspects of device 500. For example, an operating system 512 can be maintained as a computer application with the computer-readable media 508 and executed on processor 506. Device applications can also include a communication manager module 514 (which may be used to provide telephonic functionality) and a media manager 516.

Device 500 also includes an audio and/or video output 518 that provides audio and/or video data to an audio rendering and/or display system 520. The audio rendering and/or display system 520 can be implemented as integrated component(s) of the example device 500, and can include any components that process, display, and/or otherwise render audio, video, and image data. Device 500 can also be implemented to provide a user tactile feedback, such as vibrate and haptics.

As before, the blocks may be representative of modules that are configured to provide represented functionality. Further, any of the functions described herein can be implemented using software, firmware (e.g., fixed logic circuitry), manual processing, or a combination of these implementations. The terms "module," "functionality," and "logic" as used herein generally represent software, firmware, hardware or a combination thereof. In the case of a software implementation, the module, functionality, or logic represents program code that performs specified tasks when executed on a processor (e.g., CPU or CPUs). The program code can be stored in one or more computer readable memory devices. The features of the techniques described above are platform-independent, meaning that the techniques may be implemented on a variety of commercial computing platforms having a variety of processors.

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method implemented by one or more modules of a mobile device, the method comprising:
   outputting a user interface that includes a plurality of representations of media, each of the media rendered by the mobile device through execution of a respective one of a plurality of applications;
   responsive to a selection of at least one said representation, locating a corresponding said application to render the media represented by the at least one said representation; and
   rendering the media represented by the selected representation through execution of the located said application, the selected representation being rendered is displayed in the user interface as larger than another said representation of media that is not currently being rendered by the mobile device.

2. A method as described in claim 1, further comprising choosing which media is to be represented in the user interface automatically and without user intervention by the one or more modules.

3. A method as described in claim 1, wherein at least one said application is configured to render broadcast radio.

4. A method as described in claim 1, wherein at least one said application is configured to render Internet radio.

5. A method as described in claim 1, wherein at least one said application is configured to access a specific Internet site that provides the represented media.

6. A method as described in claim 1, wherein the plurality of representations are output for concurrent display on a display device of the mobile device.

7. A method as described in claim 1, wherein the user interface includes a portion having representations of the applications that are accessible to render media.

8. A method as described in claim 7, wherein the representations of the applications are selectable to initiate execution of the represented application.

9. A method as described in claim 1, wherein the user interface includes a portion having representations of media that has recently become accessible to the mobile device.

10. A method as described in claim 9, wherein one or more of the media represented in the other portion was recently purchased for use by the mobile device.

11. A method as described in claim 1, wherein the one or more modules include telephone functionality.

12. A method as described in claim 1, wherein the user interface is scrollable between the plurality of representations using a gesture.

13. A method as described in claim 1, wherein selection of said representation causes a user experience of the corresponding application to replace the user interface.

14. One or more computer-readable storage media comprising instructions that are executable to cause a mobile device to perform operations comprising:
    outputting a user interface that includes a plurality of representations of media, each of which representing media that was recently made available for output by the mobile device;
    responsive to a selection of at least one said representation, locating a corresponding said application to render the media represented by the at least one said representation; and
    rendering the media represented by the selected representation through execution of the located said application, the selected representation being rendered is displayed in the user interface as larger than another said representation of media that is not currently being rendered by the mobile device.

15. One or more computer-readable media as described in claim 14, further comprising choosing which media is to be represented in the user interface automatically and without user intervention by the one or more modules.

16. One or more computer-readable media as described in claim 15, wherein the one or more modules perform the selecting by comparing the plurality of media, one to another, that is accessible to the mobile device to determine which of the media was most recently made available to the mobile device.

17. One or more computer-readable media as described in claim 14, wherein the media was recently made available through purchase.

18. A mobile device comprising:
    a display device; and
    one or more modules to:
        determine which media is to be represented in a user interface, automatically and without user intervention, from media that was rendered by the mobile device and media that was recently made available for output by the mobile device; and
        display the user interface, on the display device, having representations of the determined media, the representations being selectable to cause a corresponding one of a plurality of applications to be executed to render the represented media, the selected representation being rendered is displayed in the user interface as larger than another said representation of media that is not currently being rendered by the mobile device.

19. A mobile device as described in claim 18, wherein at least item of said media is available via a network connection.

20. A mobile device as described in claim 18, wherein at least item of said media is stored locally by the mobile device.

* * * * *